(12) United States Patent
Schnaider et al.

(10) Patent No.: US 10,986,765 B2
(45) Date of Patent: Apr. 27, 2021

(54) SYSTEM AND METHOD FOR QUANTIFYING SOIL ROUGHNESS

(71) Applicant: Topcon Positioning Systems, Inc., Livermore, CA (US)

(72) Inventors: James Schnaider, Martensville (CA); Kevin Crowe, Saskatoon (CA)

(73) Assignee: Topcon Positioning Systems, Inc., Livermore, CA (US)

( * ) Notice: Subject to any disclaimer, the term of this patent is extended or adjusted under 35 U.S.C. 154(b) by 233 days.

(21) Appl. No.: 16/108,241

(22) Filed: Aug. 22, 2018

(65) Prior Publication Data

US 2019/0059198 A1 Feb. 28, 2019

Related U.S. Application Data

(60) Provisional application No. 62/549,293, filed on Aug. 23, 2017.

(51) Int. Cl.
*A01B 63/111* (2006.01)
*G01S 15/88* (2006.01)
(Continued)

(52) U.S. Cl.
CPC ....... *A01B 63/1112* (2013.01); *A01B 63/1115* (2013.01); *G01N 29/041* (2013.01);
(Continued)

(58) Field of Classification Search
CPC . A01B 63/1112; A01B 63/114; A01B 79/005; A01B 79/02; G01S 15/88; G01N 29/041
See application file for complete search history.

(56) References Cited

U.S. PATENT DOCUMENTS

| 8,843,283 B2 | 9/2014 | Strelioff et al. |
| 2006/0067163 A1* | 3/2006 | McEwen, IV .......... G01S 15/89 367/96 |
| 2012/0118059 A1* | 5/2012 | Reimer ............... G01F 25/0061 73/290 V |

FOREIGN PATENT DOCUMENTS

| CN | 102589487 A | 7/2012 |
| EP | 0254984 A1 | 2/1988 |

(Continued)

OTHER PUBLICATIONS

International Search Report and Written Opinion dated Oct. 31, 2018, in connection with International Patent Application No. PCT/US2018/047414, 21 pgs.

(Continued)

*Primary Examiner* — David Z Huang
(74) *Attorney, Agent, or Firm* — Chiesa Shahinian & Giantomasi PC (57) ABSTRACT

Systems and methods are provided for determining a soil roughness measure. A transducer transmits an ultrasonic signal towards a soil surface and receives a first echo signal of the ultrasonic signal and a second echo signal of the ultrasonic signal. A first distance between the transducer and a first point on the soil surface is calculated based on the first echo signal of the ultrasonic signal. A second distance between the transducer and a second point on the soil surface is calculated based on the second echo signal of the ultrasonic signal. A soil roughness measure of the soil surface is determined based on a difference between the first distance and the second distance.

21 Claims, 8 Drawing Sheets

(51) Int. Cl.
*G01N 29/04* (2006.01)
*A01B 63/114* (2006.01)
*A01B 79/00* (2006.01)
*A01B 79/02* (2006.01)

(52) U.S. Cl.
CPC ............. *G01S 15/88* (2013.01); *A01B 63/114* (2013.01); *A01B 79/005* (2013.01); *A01B 79/02* (2013.01)

(56) References Cited

FOREIGN PATENT DOCUMENTS

| FR | 2681500 A1 | 3/1993 |
|----|------------|--------|
| WO | 2012102667 A1 | 8/2012 |
| WO | 2017158006 A1 | 9/2017 |

OTHER PUBLICATIONS

Robichaud et al., "Measuring Soil Roughness Changes with an Ultrasonic Prohler", American Society of Agricultural Engineers, 1990, vol. 33, pp. 1851-1858.

* cited by examiner

SYSTEM AND METHOD FOR QUANTIFYING SOIL ROUGHNESS

CROSS-REFERENCE TO RELATED APPLICATIONS

This application claims the benefit of U.S. Provisional Application No. 62/549,293, filed Aug. 23, 2017, the disclosure of which is herein incorporated by reference in its entirety.

BACKGROUND OF THE INVENTION

The present invention relates generally to quantifying soil roughness, and more particularly to determining a measure of soil surface roughness using ultrasonic sensors.

Soil roughness refers to the variations in the level of the surface of soil due to, e.g., rock fragments and soil particles and aggregates. Soil roughness is an important parameter in agriculture, which requires specific soil conditions depending on the task (e.g., seeding). In some conditions, coarser soil roughness is desired to reduce the amount of erosion due to water runoff. However, soil roughness that is too fine may not retain as much water, while surface roughness that is too coarse may not provide sufficient contact between soil and seed.

In one conventional approach, optical systems have been used for fixed soil roughness measurements. However, such optical systems have been found to be unreliable due to optical concerns resulting from dust and ambient lighting. Such optical systems are not practical for use on agricultural equipment, such as, e.g., tractors and cultivators. In addition, many conventional soil roughness measurement systems are configured to provide stationary measurements or measurements in a laboratory environment, and are not well suited for the harsh, dirty environment typically encountered by agricultural equipment.

In an approach described in International Patent Application Publication No. WO 2017/158006, an ultrasonic sensor mounted on an agricultural implement is used to measure distances from a transducer to the ground as the agricultural implement travels over a field. The absolute distances from the transducer to the soil are used to calculate a statistical measure, such as an average variance, representing a roughness of the soil.

BRIEF SUMMARY OF THE INVENTION

In accordance with one or more embodiments, a soil roughness measure based on a relative difference of distances determined from multiple echo signal of a single ultrasonic signal is provided. Advantageously, the soil roughness measure in accordance with embodiments of the invention is less influenced by changes in the absolute distance between the transducer and the soil surface that are unrelated to soil roughness. Such a soil roughness measure is more accurate than conventional approaches that determine a soil roughness based on the absolute distance between the transducer and the soil surface.

In accordance with one or more embodiments, systems and methods are provided for determining a soil roughness measure. A transducer transmits an ultrasonic signal towards a soil surface and receives a first echo signal of the ultrasonic signal and a second echo signal of the ultrasonic signal. A first distance between the transducer and a first point on the soil surface is calculated based on the first echo signal. A second distance between the transducer and a second point on the soil surface is calculated based on the second echo signal. A soil roughness measure of the soil surface is determined based on a difference between the first distance and the second distance.

In accordance with one or more embodiments, the first echo signal is a first received echo signal of the ultrasonic signal within a receive time window and the second echo signal is a last received echo signal of the ultrasonic signal within the receive time window.

In accordance with one or more embodiments, the first point on the soil surface is a closest point on a portion of the soil surface that reflects the ultrasonic signal to the transducer.

In accordance with one or more embodiments, the transducer may be mounted on an agricultural machine.

In accordance with one or more embodiments, another transducer is mounted on the agricultural machine. The other transducer transmits another ultrasonic signal towards the soil surface and receives a third echo signal of the other ultrasonic signal and a fourth echo signal of the other ultrasonic signal. A third distance between the other transducer and a third point on the soil surface is calculated based on the third echo signal. A fourth distance between the other transducer and a fourth point on the soil surface is calculated based on the fourth echo signal. Another soil roughness measure of the soil surface is determined based on a difference between the third distance and the fourth distance.

In accordance with one or more embodiments, the transducer is mounted at a front end of the agricultural machine such that the soil roughness measure is a measure of the soil surface before the agricultural machine manipulates the soil surface and the other transducer is mounted at a rear end of the agricultural machine such that the other soil roughness measure is a measure of the soil surface after the agricultural machine manipulates the soil surface. The soil roughness measure and the other soil roughness measure may be combined (e.g., averaged).

In accordance with one or more embodiments, feedback may be provided to a user of the agricultural machine based on the soil roughness measure. The feedback may comprise parameters of the agricultural machine to manipulate the soil surface to an ideal soil conditions for a task.

These and other advantages of the invention will be apparent to those of ordinary skill in the art by reference to the following detailed description and the accompanying drawings.

DETAILED DESCRIPTION

Figure 1:
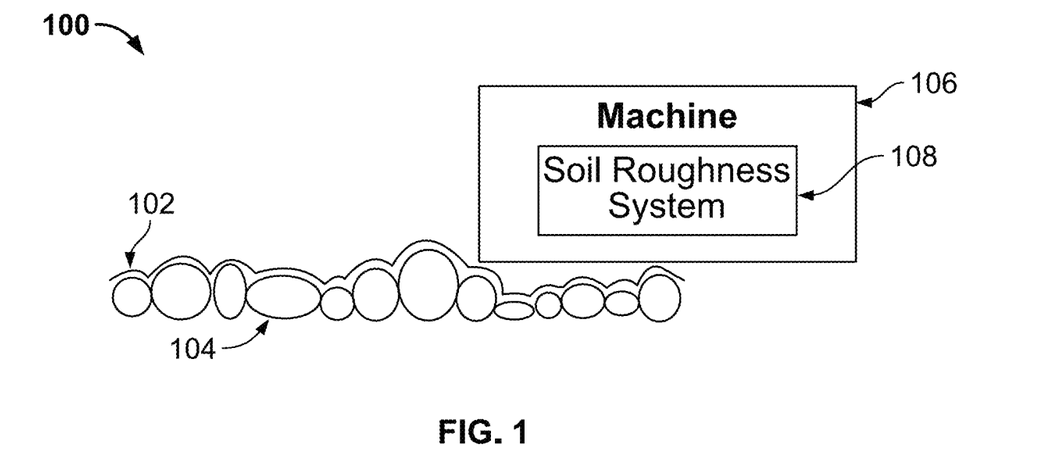
FIG. 1 shows an exemplary environment having soil roughness variability.

FIG. 1 shows an environment 100 including a soil surface 102. Environment 100 may be any suitable environment, such as, e.g., a field. Variability of the level of soil surface 102 may be due to matter 104 in the soil, such as, e.g., rock fragments, soil particles and aggregates, and other factors. The variability of the level of soil surface 102 may be due to nature, soil management, or for any other reason. The variability of the level of soil surface 102 is referred to herein as the soil roughness or the surface roughness of the soil.

Soil surface 102 may be managed and manipulated by machine 106. In one embodiment, machine 106 is an agricultural machine, such as, e.g., a tractor, a cultivator, a tiller, etc., which may be implemented as a motorized vehicle or a manually operated hand tool. It is noted that machine 106 may be of any type (e.g., an all-terrain vehicle) and is not limited to an agricultural machine. Machine 106 may include, or be equipped to include, equipment for managing and manipulating soil surface 102.

In one embodiment, machine 106 includes a soil roughness system 108 for measuring or quantifying the soil roughness of soil surface 102. While soil roughness system 108 is shown and described to be equipped on machine 106 in FIG. 1, in some embodiments, soil roughness system 108 is a discrete system that can be separately employed (e.g., manually by a user) for measuring soil roughness without machine 106.

Figure 2:
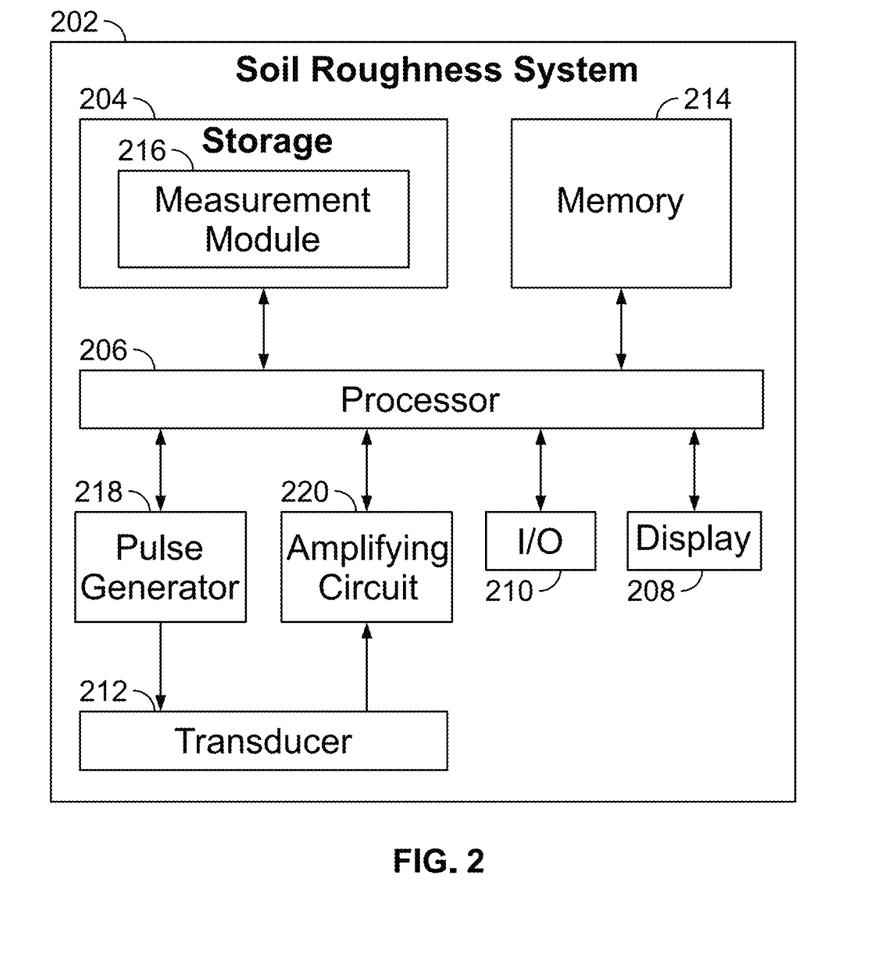
FIG. 2 shows a soil roughness system.

FIG. 2 shows a soil roughness system 202 for measuring soil roughness, in accordance with one or more embodiments. In one embodiment, soil roughness system 202 is the soil roughness system 108 in FIG. 1.

Soil roughness system 202 is configured to generate a soil roughness measure representing soil roughness of a soil surface, which may assist a user in performing a task (e.g., an agricultural task such as, e.g., cultivating or tilling). Soil roughness system 202 may include one or more processors 206 communicatively coupled to memory 214, storage 204, display device 208, and input/output devices 210. Storage 204 may store a plurality of modules representing functionality of soil roughness system 202. In one embodiment, storage 204 stores a measurement module 216 for generating a soil roughness measure. Each of the modules may be implemented as computer program instructions (e.g., code) stored in storage 204, which may be loaded into memory 214 and executed by processor 206 when execution of the computer program instructions is desired.

In operation, measurement module 216 operates in transmit-and-receive cycles. During the transmit phase, processor 206 instructs pulse generator 218 to generate an electrical signal, which is converted to an ultrasonic signal and transmitted towards a soil surface by one or more transducers 212. As used herein in this application, a transducer refers to a single device for sending and receiving signals, but also refers to a pair of discrete devices, one device for transmitting a signal and the other device for receiving a signal. In one embodiment, the ultrasonic signal is an ultrasonic pulse having a duration of approximately 70 milliseconds to 320 microseconds. The radiation pattern of the ultrasonic signal is conical in shape, centered around transducer 212 and expanding radially outward as the ultrasonic signal propagates away from transducer 212. The ultrasonic signal encounters one or more objects (e.g., soil surface 102) and reflects back as a plurality of echo signals of the ultrasonic signals.

During the receive phase, a predefined receive window is opened defining a period of time during which the plurality of echo signals of the ultrasonic signal is expected to be received by transducer 212. The receive window may be any suitable length of time to allow echo signals of the ultrasonic signal to be received by transducer 212. For example, the receive window may be 10 milliseconds in duration. Transducer 212 receives the ultrasonic echo signals and converts the ultrasonic echo signals to an electrical signal. The electrical signal is passed to amplifying circuit 220 where the electrical signal is amplified for processing by processor 206. Processor 206 calculates a distance between transducer 212 and an object (e.g., soil surface) from which the ultrasonic signal reflects for each respective echo signal based on the time elapsed between transmitting the ultrasonic signal and receiving the respective echo signal. In one embodiment, the measurement module 216 continuously operates by repeatedly performing the transmit-and-receive cycle at periodic, discrete intervals. The intervals may be any suitable length of time, such as, e.g., every 15 to 35 milliseconds.

In one embodiment, ultrasonic signal are transmitted and echo signals are received as described in U.S. Pat. No. 8,843,283, filed Sep. 24, 2012, entitled "Height Control," the disclosure of which is incorporated herein by reference in its entirety.

Figure 3A:
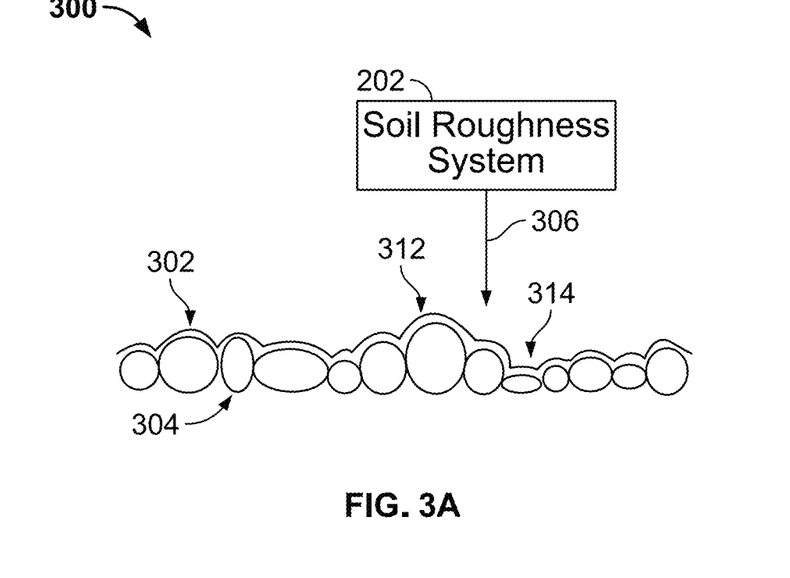
FIGS. 3A-3C show an environment in which soil roughness is measured.
Figure 3B:
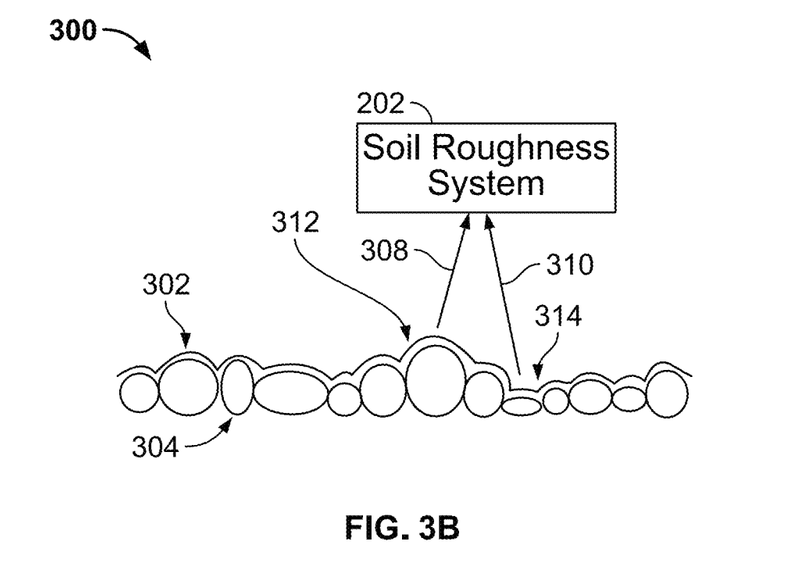
Figure 3C:
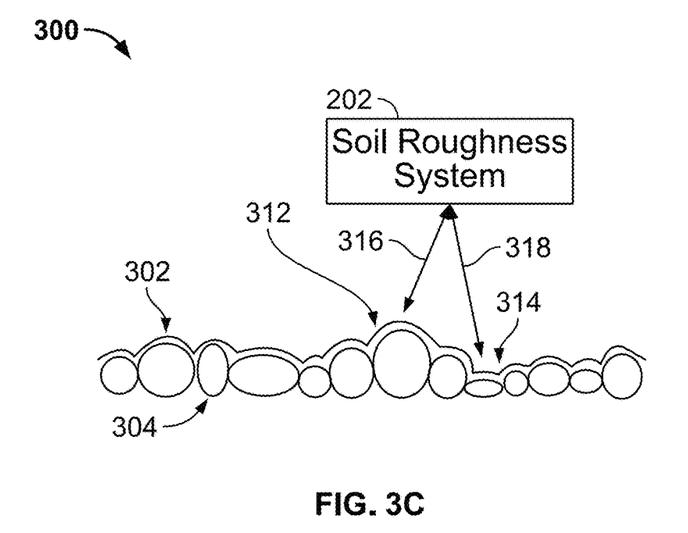

FIGS. 3A, 3B, and 3C show an environment 300 in which soil roughness is measured, in accordance with one or more embodiments. Environment 300 include a soil surface 302 having a soil roughness due to matter 304 (e.g., rock fragments, soil particles and aggregates, etc.) in the soil. FIGS. 3A, 3B, and 3C show operation of soil roughness system 202 to measure soil roughness of soil surface 302 during a single transmit-and-receive cycle. It should be understood that soil roughness system 202 may continuously measure soil roughness of soil surface 302 as soil roughness system 202 travels over soil surface 302 by repeatedly performing the transmit-and-receive cycle at periodic, discrete intervals.

FIG. 3A shows soil roughness system 202 transmitting, via transducer 212, an ultrasonic signal 306 towards soil surface 302 during a transmit phase of the transmit-and-receive cycle. Upon transmission of ultrasonic signal 306, a receive window is opened defining a period of time during which echo signals of ultrasonic signal 306 are expected to be received by transducer 212.

FIG. 3B shows ultrasonic signal 306 encountering peak point 312 and valley point 314 of soil surface 302 (among other points on soil surface 302) during a receive phase of the transmit-and-receive cycle. After a time interval, ultrasonic signal 306 reflects off of peak point 312 and valley point 314 as echo signals 308 and 310, respectively. Soil roughness system 202, via transducer 212, receives echo signals 308 and 310. Echo signal 308 reflecting from peak point 312 will be the first echo signal received by soil roughness system 202 within the receive window since ultrasonic signal 306 will encounter peak point 312 first. Echo signal 310 reflecting from valley point 314 will be the last echo signal received by soil roughness system 202 within the receive window since ultrasonic signal 306 will encounter valley point 314 last. While not shown, it should be understood that echo signals in addition to echo signals 308 and 310 may result from ultrasonic signal 306 (e.g., reflecting from intermediate points of soil surface 302) and may be received by transducer 212.

FIG. 3C shows distance 316 between transducer 212 and peak point 312 and distance 318 between transducer 212 and valley point 314 calculated by soil roughness system 202, in accordance with one or more embodiments. Distances 316 and 318 are calculated based on a time interval between when transducer 212 transmits ultrasonic signal 306 to when transducer 212 receives echo signals 308 and 310, respectively, using Equation (1):

$$\text{Distance} = \frac{\text{speed} \times \text{time}}{2} \quad (1)$$

where speed is the speed of sound as it propagates through a medium, time is the time interval between transmitting the ultrasonic signal and receiving an echo signal, and distance is the distance between transducer 212 and the object of interest (e.g., peak point 312 and valley point 314 of soil surface 302).

Soil roughness system 202 generates a soil roughness measure based on the difference between distance 316 and distance 318. For example, the soil roughness measure may be the difference between distance 318 and distance 316. By taking advantage of multiple echo signals (e.g., echo signals 308 and 310) of an ultrasonic signal (e.g., ultrasonic signal 306), the relative difference associated with these multiple echo signals can be used.

Conventional approaches determine soil roughness based on an absolute distance from a transducer to a soil surface. However, relying on measurements of the absolute distance from the transducer to the soil may result in inaccurate calculations of the roughness of the soil because the distance from the transducer to the soil is prone to changes unrelated to soil roughness. For example, the agricultural implement may bounce or sway as it travels over the field. Such movement of the agricultural implement may result in variations in the absolute distance from the transducer to the soil surface, but would not reflect changes in the soil roughness. Accordingly, the soil roughness determined by such conventional approaches may be inaccurate.

Advantageously, a soil roughness measure based on a relative difference of distances determined from multiple echo signal of a single ultrasonic signal is less influenced by changes in the distance between transducer 212 and soil surface 301 that are unrelated to soil roughness. Such a soil roughness measure is more accurate than conventional approaches that determine a soil roughness based on an absolute distance between the transducer and the soil surface.

Figure 4:
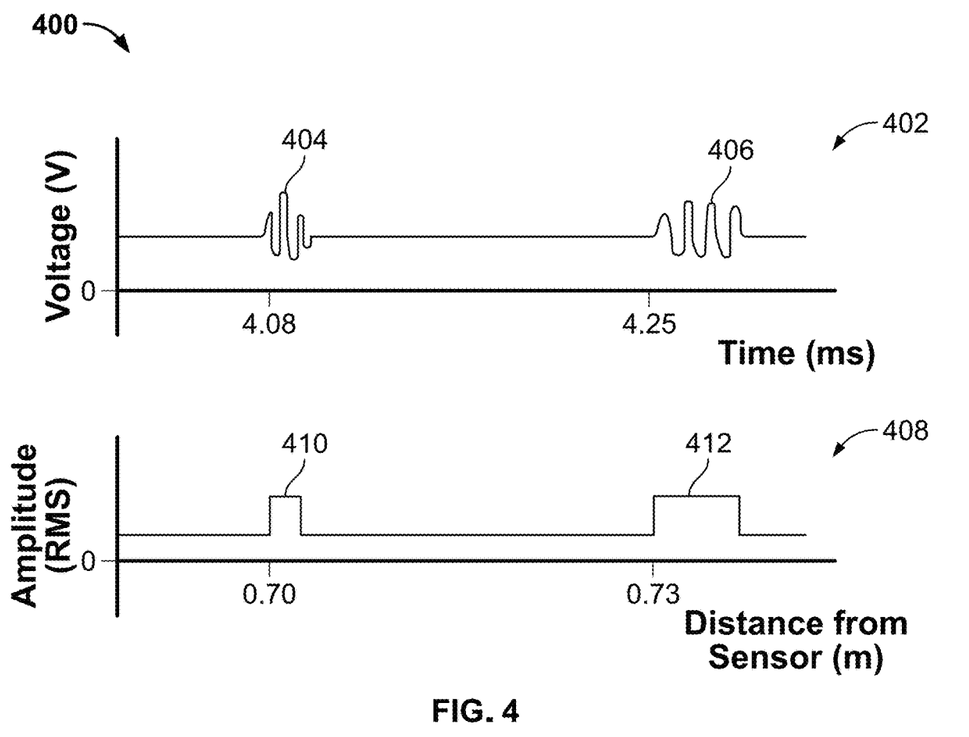
FIG. 4 shows graphs of the signal received by a transducer.

FIG. 4 shows an illustrative graph 402 of ultrasonic signals (e.g., echo signals) received by transducer 212 represented as voltage with respect to time, in accordance with one or more embodiments. The first peaks 404 in the signal received by transducer 212 occurred at approximately 4.08 milliseconds elapsed time after the ultrasonic signal was transmitted. The first peaks 404 correspond to echo signal 308 reflecting from peak point 312 and are the first echo signals to be received by transducer 212 during the receive window because peak point 312 is closest to the transducer 212. Similarly, the last peaks 406 in the signal received by transducer 212 occurred at approximately 4.25 milliseconds elapsed time after the ultrasonic signal was transmitted. Peaks 406 correspond to echo signal 310 reflecting from valley point 314 and are the last echo signals to be received by transducer 212 during the receive window because valley point 314 is furthest from transducer 212.

FIG. 4 also shows an illustrative graph 408 depicting how the ultrasonic signal received by transducer 212 (as shown in graph 402) can be interpreted as amplitude (in root mean square) with respect to distance from the sensor (e.g., transducer 212), in accordance with one or more embodiments. The elapsed times of signals 308 and 310 can be converted into distances 316 and 318 (in FIG. 3B), respectively, e.g., using Equation (1). Accordingly, peak 410, corresponding to peaks 404 in graph 402, show that peak point 312 occurred at a distance of approximately 0.70 meters from transducer 212 and peak 412, corresponding to peaks 406 in graph 402, show that valley point 314 occurred at a distance of approximately 0.73 meters from transducer 212.

It should be understood that transducer 212 may receive other signals resulting in changes to voltage and amplitude in graphs 402 and 408, respectively, but have been omitted for clarity.

Figure 5:
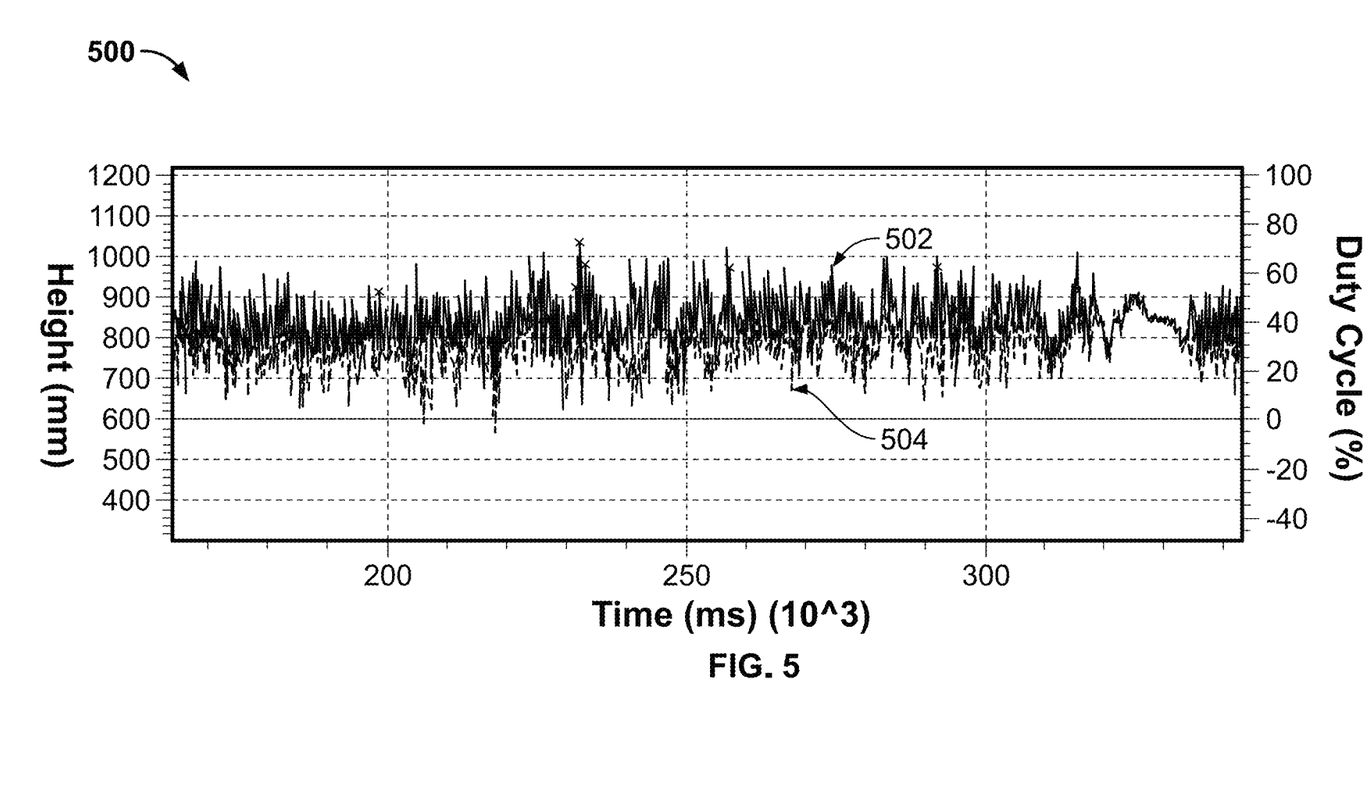
FIG. 5 shows a graph of sample data received by a transducer.

FIG. 5 shows a graph 500 of sample data plotted by height (or distance) in millimeters over time in milliseconds. The sample data shown in graph 500 may be processed data received from transducer 212 of FIG. 2, processed to show distance. Graph 500 shows distances 502 and distances 504. In one embodiment, distances 502 are distances from transducer 212 to valley point 314 (corresponding to a last echo signal received by transducer 212 during a receive window) and distances 504 are distances from transducer 212 to peak point 312 (corresponding to a first echo signal received by transducer 212 during the receive window). The difference of signals 502 and 504 is used to determine the soil roughness measure at particular instances of time using data points associated with those particular instances of time.

In one embodiment, additional logic is used to prevent errors in the signal. For instance, in one embodiment, additional logic may be used to manage signal convergence, which may occur when the peaks and valleys become so close in time and/or distance that they cannot be distinguished from each other. In another embodiment, additional logic may be used to filter out outlier results. For example, if a plant is above the surface of the soil, a windowing logic may be used to prevent the plant from being interpreted as a peak point of the soil surface. Since the proximity of the plant is much closer to the sensor than an expected change in soil roughness, the echo signal reflecting off the plant can be ignored.

In one embodiment, the signals received by transceiver 212 may be filtered to smooth the soil roughness measure calculated over time.

In one embodiment, a soil roughness measure may be calculated from a plurality of ultrasonic sensors (e.g., a plurality of transducers 212). The soil roughness measure determined from each sensor may be combined (e.g., averaged) together.

Figure 6:
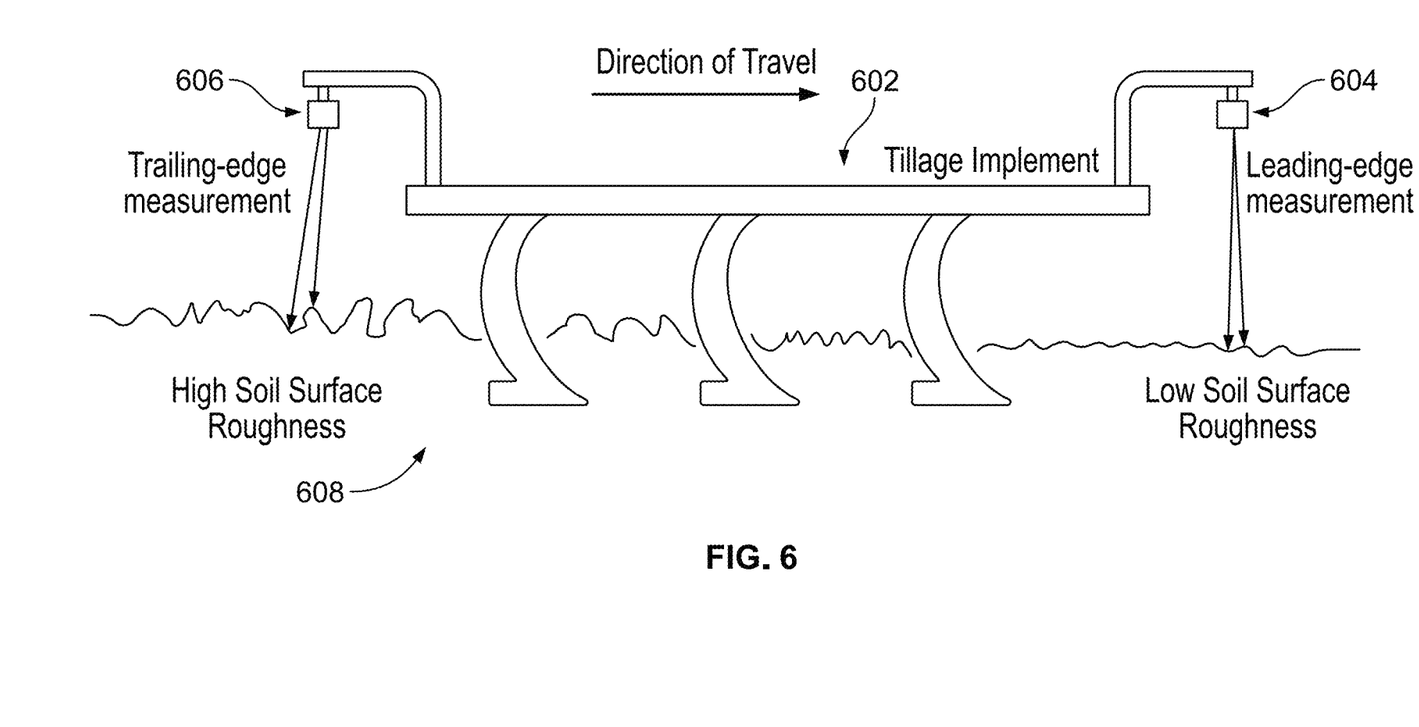
FIG. 6 shows an exemplary tillage implement.

FIG. 6 shows a tillage implement 602, in accordance with one or more embodiments. Tillage implement 602 is equipped with a soil roughness system 604 on the leading edge of tillage implement 602 and a soil roughness system 606 on the trailing edge of the tillage implement 602. In one embodiment, soil roughness systems 604 and 606 may be soil roughness system 202 in FIG. 2. Soil roughness system 604 is configured to calculate a soil roughness measure prior to tillage implement 602 manipulating soil 608 and soil roughness system 606 is configured to calculate a soil roughness measure after tillage implement 602 manipulating soil 608.

In one embodiment, soil roughness systems 604 and/or 606 may provide feedback to the user of the tillage implement, such as, e.g., audible, visual, or haptic feedback. For example, soil roughness system 606 may compare the calculated soil roughness measure of the soil after manipulation by tillage implement 602 to an ideal soil roughness measure for the relevant task or application (e.g., water management or seed placing) to provide feedback to the user for producing ideal soil conditions. In one embodiment, the feedback may provide feedback for specific parameters of the tillage implement 602 which has an influence of the tillage roughness (e.g., tillage depth, tillage implement settings, and tillage speed). In some embodiments, the calculated soil roughness measure may be used to automate functioning of tillage implement 602 for automatic operation (or partially automatic operation) of the tillage implement 602 to produce ideal soil conditions.

In the application of seedbed preparation, ideal soil conditions should provide topsoil clod/granules small enough to ensure adequate seed to soil contact, but not too small as to cause reduced moisture infiltration. Soil structure of the top layer of the soil (e.g., top 2 or 3 inches), which is important for seed placement, can be represented by the soil roughness measure calculated by soil roughness systems 604 and/or 606.

In some embodiment, the soil roughness measure may be used for providing a geographic information system (GIS) map. Further, trends in soil roughness (and soil properties that may be related to roughness, such as, e.g., soil moisture or soil composition) can be used for farm management purposes. The soil roughness measure may also be applicable in other fields, such as, e.g., roadwork surface smoothness or water management applications where measurements of surface runoff and water retention are required. In one embodiment, the soil roughness measure may be monitored and controlled to manipulate, e.g., wind and water retention.

Figure 7:
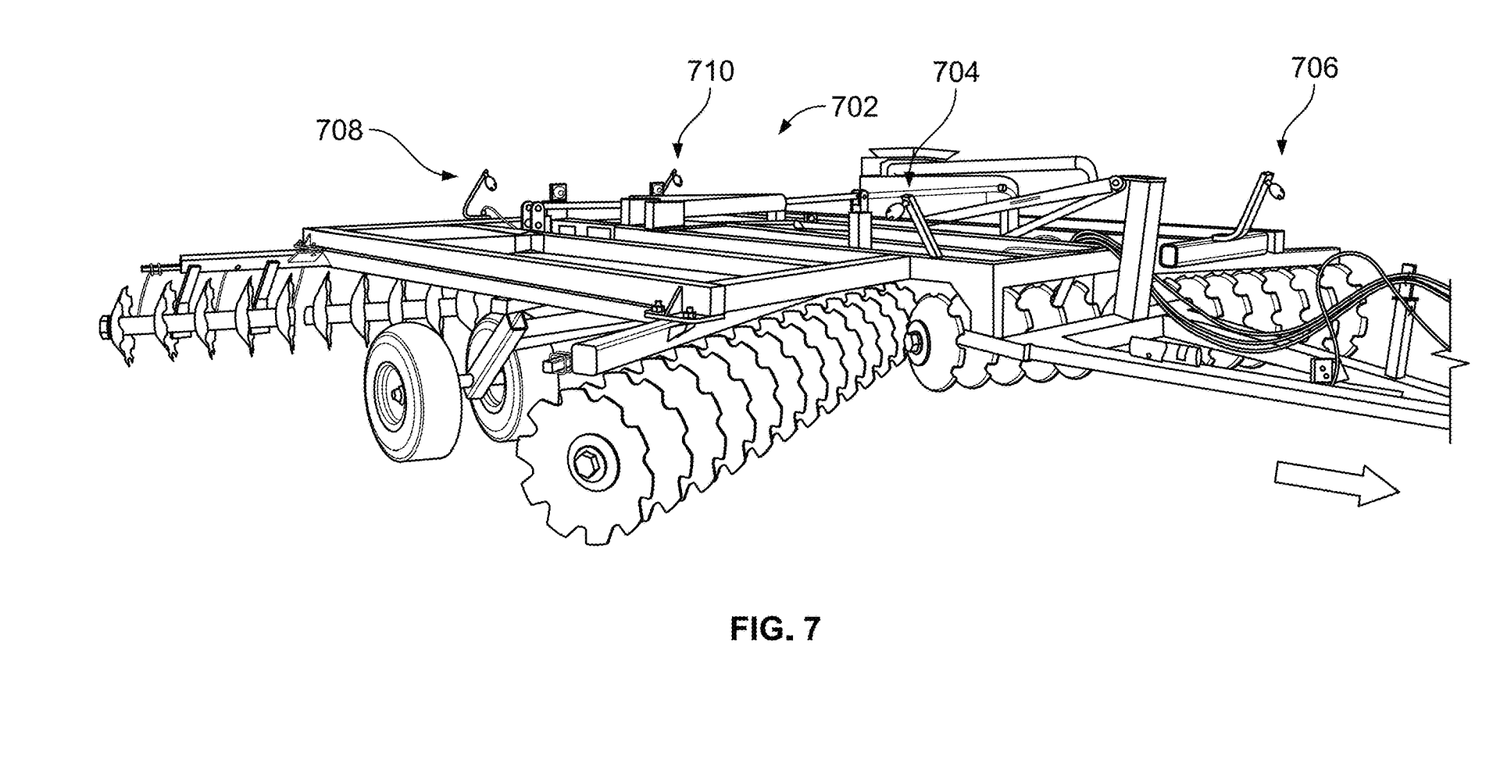
FIG. 7 shows an exemplary tillage implement.

FIG. 7 shows a tillage implement 702, in accordance with one or more embodiments. Tillage implement 702 is equipped with soil roughness systems 704 and 706 implement on the front of tillage equipment 702 and soil roughness systems 708 and 710 implement on the rear of tillage equipment 702. In one embodiment, soil roughness systems 704-710 may be soil roughness system 202 of FIG. 2. Soil roughness systems 704-710 may each provide a soil roughness measure. In some embodiments, the soil roughness measures from each of soil roughness systems 704-710 may be combined (e.g., averaged). In one embodiment, the soil roughness measures from soil roughness systems 704 and 706, representing a soil roughness prior to tillage implement 702 manipulates the soil surface, are combined and the soil roughness measures from soil roughness systems 708 and 710, representing a soil roughness after tillage implement 702 manipulates the soil surface, are combined.

Figure 8:
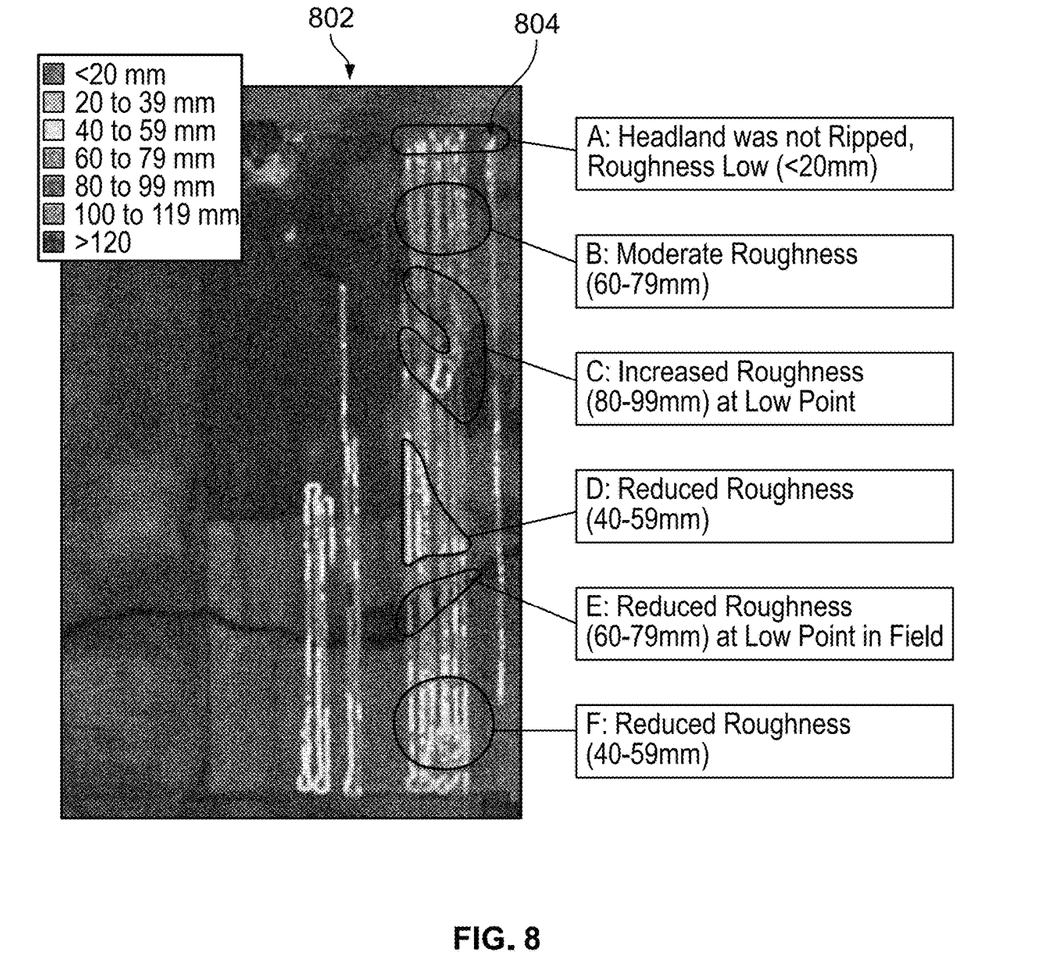
FIG. 8 shows exemplary geo-referenced soil roughness data.

FIG. 8 shows exemplary geo-referenced soil roughness data from a tillage operation of a field, in accordance with one or more embodiments. FIG. 8 shows an image 802 of a field having different soil conditions (e.g., due to a tillage operation, nature, etc.) resulting in different soil roughness measures. Soil roughness data 804 may be represented on image 802 of the field. In one embodiment, the soil roughness data 804 may be geo-referenced on image 802 of the field to represent soil roughness on image 802, e.g., by color, by pattern, or by any other suitable approach. Upper portion of the field in image 802 shows lower elevated land, which may be a result of what crop was grown on each field location the previous year and what the soil parameters for this portion of the field are. In lower elevated land, water is typically collected so that the soil is expected to be moister. The increased moisture makes the soil roughness greater after tilling the land, as represented by soil roughness data 804. Lower portion of the field in image 802 shows higher elevated land, which is likely to be dryer. Dryer soil results in smaller clod sizes when tilling and, therefore, reduced soil roughness, as represented by soil roughness data 804.

Figure 9:
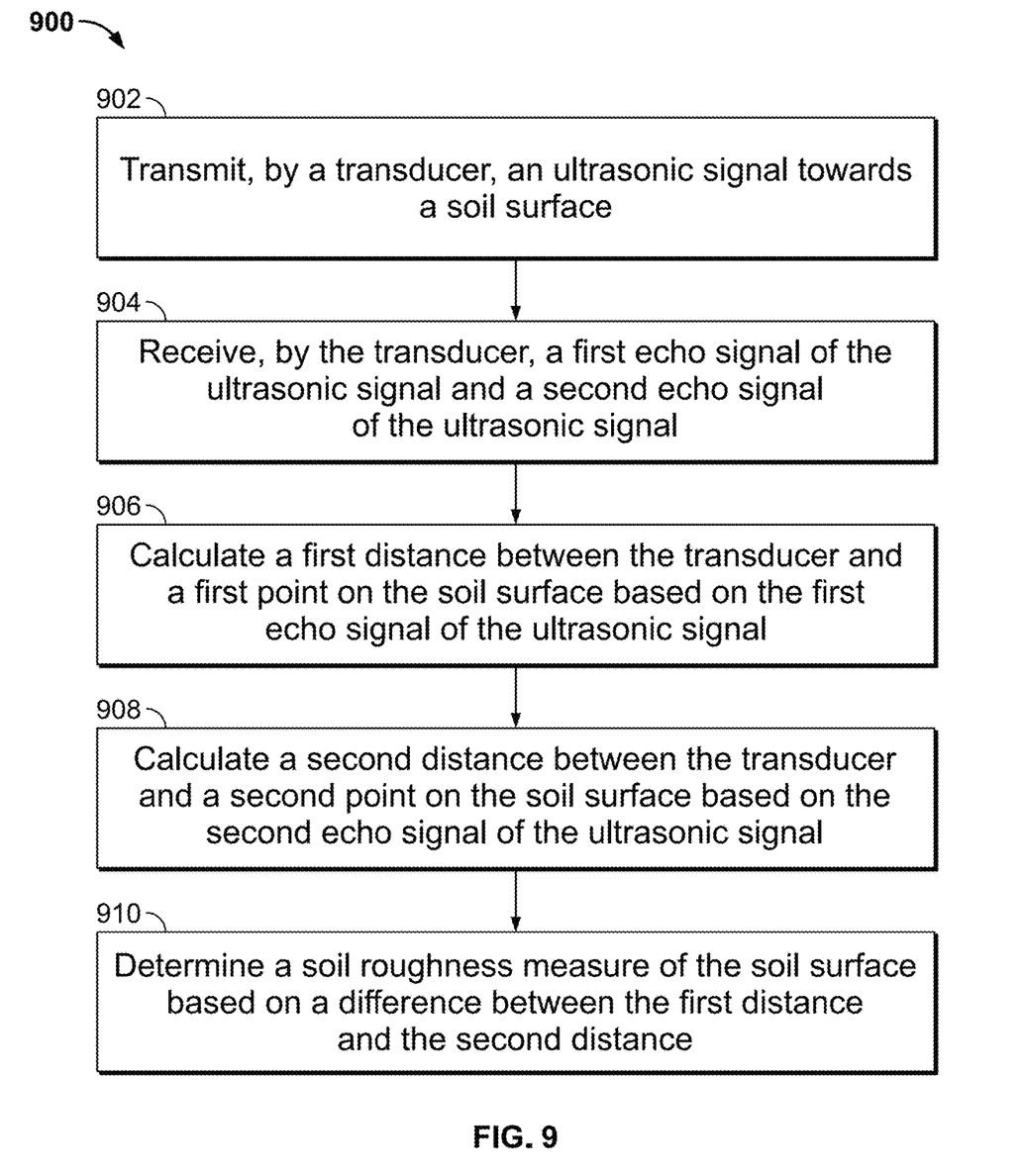
FIG. 9 shows an exemplary method for determining a soil roughness measure.

FIG. 9 shows a method 900 for determining a soil roughness measure, in accordance with one or more embodiments. In one embodiment, the steps of method 900 may be performed by soil roughness system 108 of FIG. 1 or soil roughness system 202 of FIG. 2.

At step 902, an ultrasonic signal is transmitted by a transducer towards a soil surface. The ultrasonic signal may be transmitted during a transmit phase of a transmit-and-receive cycle. Upon transmitting the ultrasonic signal, a receive time window is opened during which echo signals of the ultrasonic signals are expected to be received. In one embodiment, the transducer is mounted on an agricultural machine (e.g., a tillage implement)

At step 904, a first echo signal of the ultrasonic signal and a second echo signal of the ultrasonic signal are received by the transducer. The first and second echo signals may be received during a receive phase of the transmit-and-receive cycle. In one embodiment, the first echo signal is a first received echo signal of the ultrasonic signal within the receive time window and the second echo signal is a last received echo signal of the ultrasonic signal within the receive time window.

At step 906, a first distance between the transducer and a first point on the soil surface is calculated based on the first echo signal of the ultrasonic signal. In one embodiment, the first point on the soil surface is a closest point (i.e., a peak point) on a portion of the soil surface that reflects the ultrasonic signal to the transducer. The first distance may be calculated using Equation (1).

At step 908, a second distance between the transducer and a second point on the soil surface is calculated based on the second echo signal of the ultrasonic signal. In one embodiment, the second point on the soil surface is a furthest point (i.e., a valley point) on the portion of the soil surface that reflects the ultrasonic signal to the transducer. The second distance may be calculated using Equation (1).

At step 910, a soil roughness measure of the soil surface is determined based on a difference between the first distance and the second distance. In one embodiment, feedback may be provided to a user of the agricultural machine based on the soil roughness measure. The feedback may include parameters of the agricultural machine to manipulate the soil surface to an ideal soil conditions for a task.

In one embodiment, a second transducer is mounted on the agricultural machine for transmitting another ultrasonic signal towards the soil surface and receiving a third echo signal of the other ultrasonic signal and a fourth echo signal of the other ultrasonic signal. A third distance between the other transducer and a third point on the soil surface is calculated based on the third echo signal of the other ultrasonic signal. A fourth distance between the other transducer and a fourth point on the soil surface is calculated based on the fourth echo signal of the other ultrasonic signal. Another soil roughness measure of the soil surface is determined based on a difference between the third distance and the fourth distance. The soil roughness measure and the other soil roughness measure may be combined (e.g., averaged). In one embodiment, the soil roughness measure is a measure of the soil surface before the agricultural machine manipulates the soil surface and the other soil roughness measure is a measure of the soil surface after the agricultural machine manipulates the soil surface.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps of the methods and workflows described herein. Certain steps of the methods and workflows described herein may be performed by a server or by another processor in a network-based cloud-computing system. Certain steps of the methods and workflows described herein may be performed by a client computer in a network-based cloud computing system. The steps of the methods and workflows described herein may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Soil roughness system 202 of FIG. 2 may comprise a computer to implement systems, apparatus, and methods described herein. Processor 206 controls the overall operation of soil roughness system 202 by executing computer program instructions that define such operations. The computer program instructions may be stored in storage 204, memory 214, or other computer readable medium. Thus, the method and workflow steps described herein can be defined by the computer program instructions stored in storage 204 or memory 214 and controlled by processor 206 executing the computer program instructions. For example, the computer program instructions can be implemented as computer executable code programmed by one skilled in the art to perform the method and workflow steps described herein, such as the steps of method 900 of FIG. 9. Accordingly, by executing the computer program instructions, the processor 206 executes the method and workflow steps described herein, such as the steps of method 900 of FIG. 9. Soil roughness system 202 may also include one or more network interfaces (not shown) for communicating with other devices via a network. Soil roughness system 202 may also include one or more input/output devices 210 that enable user interaction with the system 202 (e.g., display, keyboard, mouse, speakers, buttons, etc.).

Processor 206 may include both general and special purpose microprocessors, and may be the sole processor or one of multiple processors of soil roughness system 202. Processor 206 may include one or more central processing units (CPUs), for example. Processor 206 and/or memory 204 may include, be supplemented by, or incorporated in, one or more application-specific integrated circuits (ASICs) and/or one or more field programmable gate arrays (FPGAs).

Storage 204 and memory 214 may include a tangible non-transitory computer readable storage medium. Storage 204 and memory 204 may include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 210 may include peripherals, such as a printer, scanner, display screen, etc. For example, input/output devices 210 may include a display device such as a cathode ray tube (CRT) or liquid crystal display (LCD) monitor for displaying information to the user, a keyboard, and a pointing device such as a mouse or a trackball by which the user can provide input to soil roughness system 202.

Any or all of the systems and apparatus discussed herein may be implemented using one or more computers such as soil roughness system 202 of FIG. 2.

One skilled in the art will recognize that an implementation of an actual computer or computer system may have other structures and may contain other components as well, and that soil roughness system 202 in FIG. 2 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a soil roughness measure comprising:
   transmitting, by a transducer, an ultrasonic signal towards a soil surface;
   receiving, by the transducer, 1) a first echo signal as a direct reflection of the ultrasonic signal from a first point on the soil surface, and 2) a second echo signal as a direct reflection of the ultrasonic signal from a second point on the soil surface, wherein the first echo signal is a first received echo signal of the ultrasonic signal within a time window and the second echo signal is a last received echo signal of the ultrasonic signal within the time window;
   calculating a first distance between the transducer and the first point on the soil surface based on the first echo signal;
   calculating a second distance between the transducer and the second point on the soil surface based on the second echo signal; and
   determining a soil roughness measure of the soil surface based on a difference between the first distance and the second distance.

2. The method of claim 1, wherein:
   the first point on the soil surface is a closest point on a portion of the soil surface that reflects the ultrasonic signal to the transducer; and
   the second point on the soil surface is a furthest point on the portion of the soil surface that reflects the ultrasonic signal to the transducer.

3. The method of claim 1, wherein the transducer is mounted on an agricultural machine.

4. The method of claim 3, further comprising:
   transmitting, by another transducer mounted on the agricultural machine, another ultrasonic signal towards the soil surface;
   receiving, by the other transducer, a third echo signal of the other ultrasonic signal and a fourth echo signal of the other ultrasonic signal;
   calculating a third distance between the other transducer and a third point on the soil surface based on the third echo signal;
   calculating a fourth distance between the other transducer and a fourth point on the soil surface based on the fourth echo signal; and
   determining another soil roughness measure of the soil surface based on a difference between the third distance and the fourth distance.

5. The method of claim 4, wherein the soil roughness measure is a measure of the soil surface before the agricultural machine manipulates the soil surface and the other soil roughness measure is a measure of the soil surface after the agricultural machine manipulates the soil surface.

6. The method of claim 4, further comprising:
   combining the soil roughness measure and the other soil roughness measure.

7. The method of claim 3, further comprising:
   providing feedback to a user of the agricultural machine based on the soil roughness measure.

8. The method of claim 7, wherein the feedback comprises parameters of the agricultural machine to manipulate the soil surface to an ideal soil conditions for a task.

9. A non-transitory computer readable medium storing computer program instructions for determining a soil roughness measure, the computer program instructions when executed by a processor cause the processor to perform operations comprising:
   calculating a first distance between a transducer and a first point on a soil surface based on a first echo signal, the first echo signal being a direct reflection of an ultrasonic signal from the first point on the soil surface, the ultrasonic signal transmitted by the transducer towards the soil surface;
   calculating a second distance between the transducer and a second point on the soil surface based on a second echo signal, the second echo signal being a direct reflection of the ultrasonic signal from the second point on the soil surface, wherein the first echo signal is a first received echo signal of the ultrasonic signal within a time window and the second echo signal is a last received echo signal of the ultrasonic signal within the time window; and
   determining a soil roughness measure of the soil surface based on a difference between the first distance and the second distance.

10. The non-transitory computer readable medium of claim 9, wherein:
    the first point on the soil surface is a closest point on a portion of the soil surface that reflects the ultrasonic signal to the transducer; and
    the second point on the soil surface is a furthest point on the portion of the soil surface that reflects the ultrasonic signal to the transducer.

11. The non-transitory computer readable medium of claim 9, wherein the transducer is mounted on an agricultural machine.

12. An apparatus for determining a soil roughness measure comprising:
    a processor; and
    a memory to store computer program instructions, the computer program instructions when executed on the processor cause the processor to perform operations comprising:
    calculating a first distance between a transducer and a first point on a soil surface based on a first echo signal, the first echo signal being a direct reflection of an ultrasonic signal from the first point on the soil surface, the ultrasonic signal transmitted by the transducer towards the soil surface;
    calculating a second distance between the transducer and a second point on the soil surface based on a second echo signal, the second echo signal being a direct reflection of the ultrasonic signal from the second point on the soil surface, wherein the first echo signal is a first received echo signal of the ultrasonic signal within a time window and the second echo signal is a last received echo signal of the ultrasonic signal within the time window; and
    determining a soil roughness measure of the soil surface based on a difference between the first distance and the second distance.

13. The apparatus of claim 12, wherein the transducer is mounted on an agricultural machine.

14. The apparatus of claim 13, the operations further comprising:
    calculating a third distance between another transducer and a third point on the soil surface based on a third echo signal of another ultrasonic signal, the other ultrasonic signal transmitted by the other transducer towards the soil surface;

calculating a fourth distance between the other transducer and a fourth point on the soil surface based on a fourth echo signal of the other ultrasonic signal; and determining another soil roughness measure of the soil surface based on a difference between the third distance and the fourth distance.

15. The apparatus of claim 14, wherein the soil roughness measure is a measure of the soil surface before the agricultural machine manipulates the soil surface and the other soil roughness measure is a measure of the soil surface after the agricultural machine manipulates the soil surface.

16. The apparatus of claim 14, the operations further comprising:

combining the soil roughness measure and the other soil roughness measure.

17. The apparatus of claim 13, the operations further comprising:

providing feedback to a user of the agricultural machine based on the soil roughness measure.

18. The apparatus of claim 17, wherein the feedback comprises parameters of the agricultural machine to manipulate the soil surface to an ideal soil conditions for a task.

19. An agricultural machine for manipulating a soil surface comprising:

a transducer mounted on the agricultural machine, the transducer for:

transmitting an ultrasonic signal towards the soil surface, and receiving 1) a first echo signal as a direct reflection of the ultrasonic signal from a first point on the soil surface and 2) a second echo signal as a direct reflection of the ultrasonic signal from a second point on the soil surface, wherein the first echo signal is a first received echo signal of the ultrasonic signal within a time window and the second echo signal is a last received echo signal of the ultrasonic signal within the time window;

a processor; and a memory to store computer program instructions, the computer program instructions when executed on the processor cause the processor to perform operations comprising:

calculating a first distance between the transducer and the first point on the soil surface based on the first echo signal;

calculating a second distance between the transducer and the second point on the soil surface based on the second echo signal; and determining a soil roughness measure of the soil surface based on a difference between the first distance and the second distance.

20. The agricultural machine of claim 19, wherein the first point on the soil surface is a closest point on a portion of the soil surface that reflects the ultrasonic signal to the transducer; and the second point on the soil surface is a furthest point on the portion of the soil surface that reflects the ultrasonic signal to the transducer.

21. The agricultural machine of claim 19, wherein the transducer is mounted on at a front of the agricultural machine, and the agricultural machine further comprises:

another transducer mounted at a rear of the agricultural machine, the other transducer for:

transmitting another ultrasonic signal towards the soil surface, and receiving a third echo signal of the other ultrasonic signal and a fourth echo signal of the other ultrasonic signal; and the operations further comprising:

calculating a third distance between the other transducer and a third point on the soil surface based on the third echo signal, calculating a fourth distance between the other transducer and a fourth point on the soil surface based on the fourth echo signal, and determining another soil roughness measure of the soil surface based on a difference between the third distance and the fourth distance;

wherein the soil roughness measure is a measure of the soil surface before the agricultural machine manipulates the soil surface and the other soil roughness measure is a measure of the soil surface after the agricultural machine manipulates the soil surface.

* * * * *